Patented Apr. 8, 1952

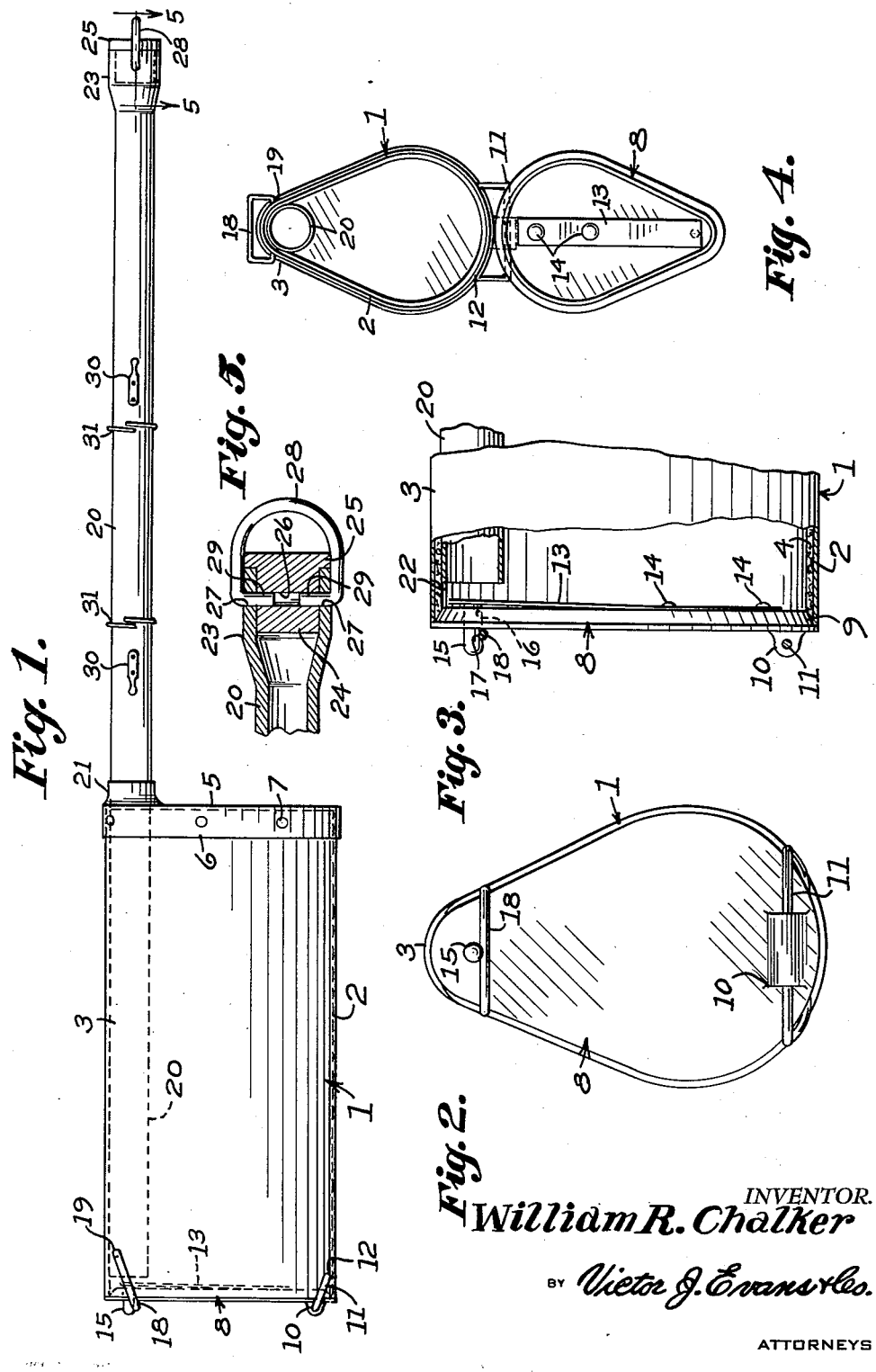

2,591,674

UNITED STATES PATENT OFFICE 2,591,674

FISHING ROD CARRYING CASE

William R. Chalker, Texarkana, Tex.

Application August 10, 1949, Serial No. 109,560

1 Claim. (Cl. 206—16)

The present invention relates to the general class of fishing, and more specifically to an improved fishing rod carrying case or protective receptacle, designed to receive and contain fishing tackle including disjointed rods, reels, hooks, and other accessories when not in use; and to afford convenient equipment for the fisherman which is readily accessible for withdrawal of the rod and accessories when required for use.

The primary object of the invention is the provision of a case of this type that may with facility be manufactured at low cost of production to insure a compactly arranged and durable article of manufacture in which the various accessories may be stored with convenience; the loaded case may be transported or carried with facility; and the case is provided with quick-detachable closures to facilitate storing as well as withdrawal of the various articles carried in the case.

The invention consists in certain novel features of construction and combinations and arrangements of parts as will hereinafter be described and more particularly set forth in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim without departing from the principles of the invention.

Figure 1 is a view in side elevation of a fishing rod carrying case in which my invention is embodied.

Figure 2 is an enlarged rear end view of the case.

Figure 3 is a broken fragmentary view, partly in section showing the relation of the case and the rear end of the rod-barrel, together with the hinged closure of the case.

Figure 4 is a rear end view of the case with the drop-door wide open; and

Figure 5 is an enlarged detail sectional view at line 5—5 of Fig. 1.

In carrying out my invention I employ a case 1 of lightweight metal, molded plastic, or other suitable material fashioned as a receptable for the rod handle and accessories and preferably provided with a semi-cylindrical body 2 having its walls converging to a smaller rounded apex 3.

The interior of the case is provided with a protective lining 4 of cork, felt, or other similar material to eliminate possibility of marring the accessories stored within the case, and the front end of the case is closed by a reinforcing cap or head 5 having an attaching flange 6 which is riveted at 7, or otherwise secured to the exterior of the case.

To facilitate access to the interior of the case a free swinging door-drop 8 having a bevel edge 9 for close fitting in the rear open end of the case, is provided with an exterior perforated lug or ear 10 which forms a pivotal bearing for a somewhat U-shaped hinge bail 11 having its spaced ends pivoted at 12 to the case.

By this arrangement of the hinged bail the drop door is free to swing clear of the rear opening of the case, as indicated in Fig. 4 to remove all obstructions from the path of the accessories as they are stored in or withdrawn from the interior of the case.

Quick-detachable fastening means are provided for securing the door in closed position, which means includes a spring blade 13 located against the inner side of the door and fastened at one end, as by rivets 14 to the door. The blade is centrally located and extends longitudinally of the door, and its free end is equipped with a head 15 that projects through an opening 16 in the door; the exterior end of the head being fashioned with a transverse groove 17.

For co-action with the grooved head of the spring blade, a latch-bail 18 of resilient material is hinged at 19 on the apex or head of the casing, and as indicated in Figs. 1 and 3 the latch is designed to swing under the projecting head and snap under the groove 17 for locking the door in closed position; and with equal facility the fastening device may be released by slipping the latch bail from under the grooved head.

To accommodate the sections of a fly-rod, or to receive a casting rod, a cylindrical barrel or tube 20 of sufficient length is mounted in the apex of the casing and projects therefrom, with its inner end opening within the case near its open rear end to provide an unobstructed storage receptacle. For rigidly mounting the barrel or tube an exterior ferrule 21 is provided for joining the tube to the front end of the case and the inner end of the tube is welded, as at 22 to the inner face of the rounded apex of the case.

The front end of the tube is preferably enlarged to form a head 23 that forms a socket or seat for a plug 24 having an exterior flange 25, and as seen in Fig. 5 the plug is fashioned with a transverse bore or hole 26 that registers with complementary holes 27 in the socket end of the tube. A suspending bail 28, which also locks the closure plug in place, has its ends 29 pivotally mounted in the registering holes or bores 26 and 27, for retaining the plug in closed position, and the bail may also be utilized for suspending the equipment from a nail or hook when not in use.

Means are provided on the barrel, for suspending lines after removal from a reel, for drying out moisture, and for this purpose I employ a pair of spaced clips or cleats 30, 30, as best seen in Fig. 1 that are riveted or otherwise secured in alined position on the exterior of the tube or barrel.

The line may be looped between the cleats, and a pair of adjustable spring rings 31, 31 are also mounted on the tube between the cleats to retain the loops of the line in place, thus exposing the wet line to the atmosphere for drying before replacement on the reel.

Having thus fully described my invention, what I claim, as new and desire to secure by Letters Patent is:

A fishing rod case having a rear open end, a drop-door closing said rear end, a rectangular bail having spaced ends pivoted in the case, an exterior perforated ear on the door pivotally mounted on the bail, a spring blade attached at one end to the inner face of the door, a latching head mounted on the free end of the blade and projecting through a hole in the door, and a resilient bail pivoted on the case for snapping co-action with an exterior groove on said head.

WILLIAM R. CHALKER.

REFERENCES CITED

The following references are of record in the file of this patent:

UNITED STATES PATENTS

| Number | Name | Date |
|---|---|---|
| 1,162,951 | Selby | Dec. 7, 1915 |
| 1,394,672 | Davis | Oct. 25, 1921 |
| 1,478,365 | Wright | Dec. 18, 1923 |
| 1,538,112 | Haubroe | May 19, 1925 |
| 1,806,364 | Newman | May 19, 1931 |